United States Patent [19]

Loisy et al.

[11] Patent Number: 5,535,253
[45] Date of Patent: Jul. 9, 1996

[54] METHOD AND DEVICE FOR DETECTING LEAKS IN PENETRATIONS OF A NUCLEAR REACTOR VESSEL HEAD DURING OPERATION

[75] Inventors: François Loisy, Rueil Malmaison; Jean-Luc Germain, Chatou, both of France

[73] Assignee: Electricite de France - Service National, Paris, France

[21] Appl. No.: 256,302

[22] PCT Filed: Nov. 3, 1993

[86] PCT No.: PCT/FR93/01084

§ 371 Date: Sep. 2, 1994

§ 102(e) Date: Sep. 2, 1994

[87] PCT Pub. No.: WO94/11882

PCT Pub. Date: May 26, 1994

[30] Foreign Application Priority Data

Nov. 6, 1992 [FR] France ................................. 92 13417

[51] Int. Cl.$^6$ ................................................. G21C 17/00
[52] U.S. Cl. ......................... 376/250; 376/246; 376/251; 376/256; 376/255
[58] Field of Search ........................... 376/250, 246, 376/251, 256, 255; 73/493, 504, 40, 40.7, 45.4, 49.3

[56] References Cited

U.S. PATENT DOCUMENTS

| 3,087,327 | 4/1963 | Kagi | 73/40.7 |
|---|---|---|---|
| 3,644,172 | 2/1972 | Campbell | 376/250 |
| 3,762,212 | 10/1973 | Morley et al. | 73/40.7 |
| 3,849,655 | 11/1974 | Martucci | 250/366 |
| 3,969,077 | 7/1976 | Hill | 23/230 L |
| 4,147,431 | 4/1979 | Mann | 356/72 |
| 4,199,975 | 4/1980 | Schrock et al. | 73/40.7 |
| 4,364,261 | 12/1982 | Askwith et al. | 73/40 |
| 4,468,609 | 8/1984 | Schmitz | 324/61 QS |
| 4,640,121 | 2/1987 | Leuker et al. | 73/40.5 |
| 4,749,855 | 6/1988 | Watanabe | 250/227 |
| 4,893,497 | 1/1990 | Danielson | 73/40.7 |
| 5,027,507 | 7/1991 | Nelson et al. | 29/890.08 |
| 5,049,168 | 9/1991 | Danielson | 55/17 |
| 5,258,050 | 11/1999 | Danielson | 55/17 |
| 5,329,465 | 7/1994 | Arcella et al. | 364/551.01 |
| 5,345,479 | 9/1994 | Graham | 376/250 |

FOREIGN PATENT DOCUMENTS

| 1493249 | 7/1967 | France . |
|---|---|---|
| 7727524 | 3/1979 | France . |
| 1063292 | 8/1959 | Germany . |
| 828468 | 2/1960 | United Kingdom . |

*Primary Examiner*—Donald P. Walsh
*Assistant Examiner*—Meena Chelliah
*Attorney, Agent, or Firm*—Sughrue, Mion, Zinn, Macpeak & Seas

[57] ABSTRACT

The method and the device are applicable to the penetrations (2) of a pressurised water nuclear reactor vessel head (1) during operation.

The device includes a double circuit for picking off two gas samples (100, 16, 17; 12, 13, 14, 15) and a measurement assembly (18) which regularly compares the content, especially of water vapour, in the two samples picked off. The first sample is taken from the volume of a chamber (7) where the possible leak (10) emerges, and the second in proximity to the head (1) outside the region immediately affected by the leak. The assembly (18) makes it possible to generate (19) an alarm in the event of a leak and to distinguish it from operational alarms.

Techniques and means are also provided for determining the flow rate of sweeping in the volume of the chamber (7) and for checking the pick-off and detection systems.

15 Claims, 7 Drawing Sheets

FIG·1

METHOD AND DEVICE FOR DETECTING LEAKS IN PENETRATIONS OF A NUCLEAR REACTOR VESSEL HEAD DURING OPERATION

BACKGROUND OF THE INVENTION

The invention relates to the detection and evaluation of the strength of leaks situated on the head of a nuclear reactor vessel filled with pressurised water at high temperature.

The leaks are detected and evaluated using a tracer gas: the water vapour itself, which comes from the leak under investigation.

One particularly important application of the invention consists in the detection of leaks in penetrations of pressurised water nuclear reactor vessel heads. The penetrations in question are those which allow the control rods of the control rod clusters to pass through. Early detection of such leaks allows the operator to bring the installation to a safe fall-back operating condition.

Techniques for detecting leaks in vessel head penetrations are already known, derived from those used for detecting leaks in heat exchangers. Many solutions use monitoring by dilution of a :radioactive tracer. In certain devices, this solution, using monitoring of the particle radioactivity, leads to detection thresholds and integration times which are high because of the extreme dilution of the tracer. Other known solutions do not make it possible to give any direct indication as to the strength of the leak, and have the drawback of being essentially qualitative.

SUMMARY OF THE INVENTION

The invention aims to provide a method and a device for detecting leaks in penetrations of a water nuclear reactor vessel head which make it possible rapidly to detect the appearance of a leak and to follow its development, while using only simple means and elements which can be adapted to reactors with different powers.

The subject of the invention is a device for detecting leaks in penetrations of a nuclear power station vessel head, characterized in that it comprises a circuit for picking off the air flowing in the volume of the chamber where potential leaks emerge, before this air is diluted in the cooling circuit of the control mechanisms of the control rod clusters of the reactor.

For this purpose, the invention provides a method according to which the chamber where the potential leaks emerge is swept through by a flow of air, and an increase in the level of tracer gas in this sweeping air, caused by a leak, is detected by picking off.

The high sensitivity of the method provided is derived from the fact that the picking off is carried out within the volume of the chamber where the leak emerges. Because of this picking off, the measurement of the level of tracer gas is made before this tracer gas is significantly diluted in the strong flow of air used for cooling the control mechanisms of the control rod clusters.

For implementing this method, use is made of a device which is remote-controlled by a computer of the industrial type. The computer manages the various operational sequences of this device, processes the measurements from various sensors and provides diagnostics on the state of operation of the device, on the existence of the leak and its strength.

The invention also provides novel techniques which allow, on the one hand, simulation of the leaks in order to estimate the flow rate of sweeping of air passing through the volume of the chamber where the potential leaks emerge, and thus evaluating and following the development of the possible leakage flow, and, on the other hand, checking correct operation of the pick-off and leak detection circuits.

The invention will be better understood on reading the description and the claims which follow of particular embodiments, which are given solely by way of non-limiting examples, as well as on inspecting the drawing, in which:

DESCRIPTION OF PREFERRED EMBODIMENTS

Since the arrangement of nuclear installations and in particular of their ventilation and/or cooling circuit are well known in the state of the art, a description will be given below only of those points directly or indirectly relating to the invention. For the rest, the person skilled in the art of the technical sector in question will draw on the currently available conventional solutions when tackling the particular problems with which he is confronted.

The same reference number will always be used below to identify a similar element, whatever the embodiment or its variant.

For clarity of explanation, each of the constituent parts of the invention will be described in succession before explaining their implementation.

Figure 1:
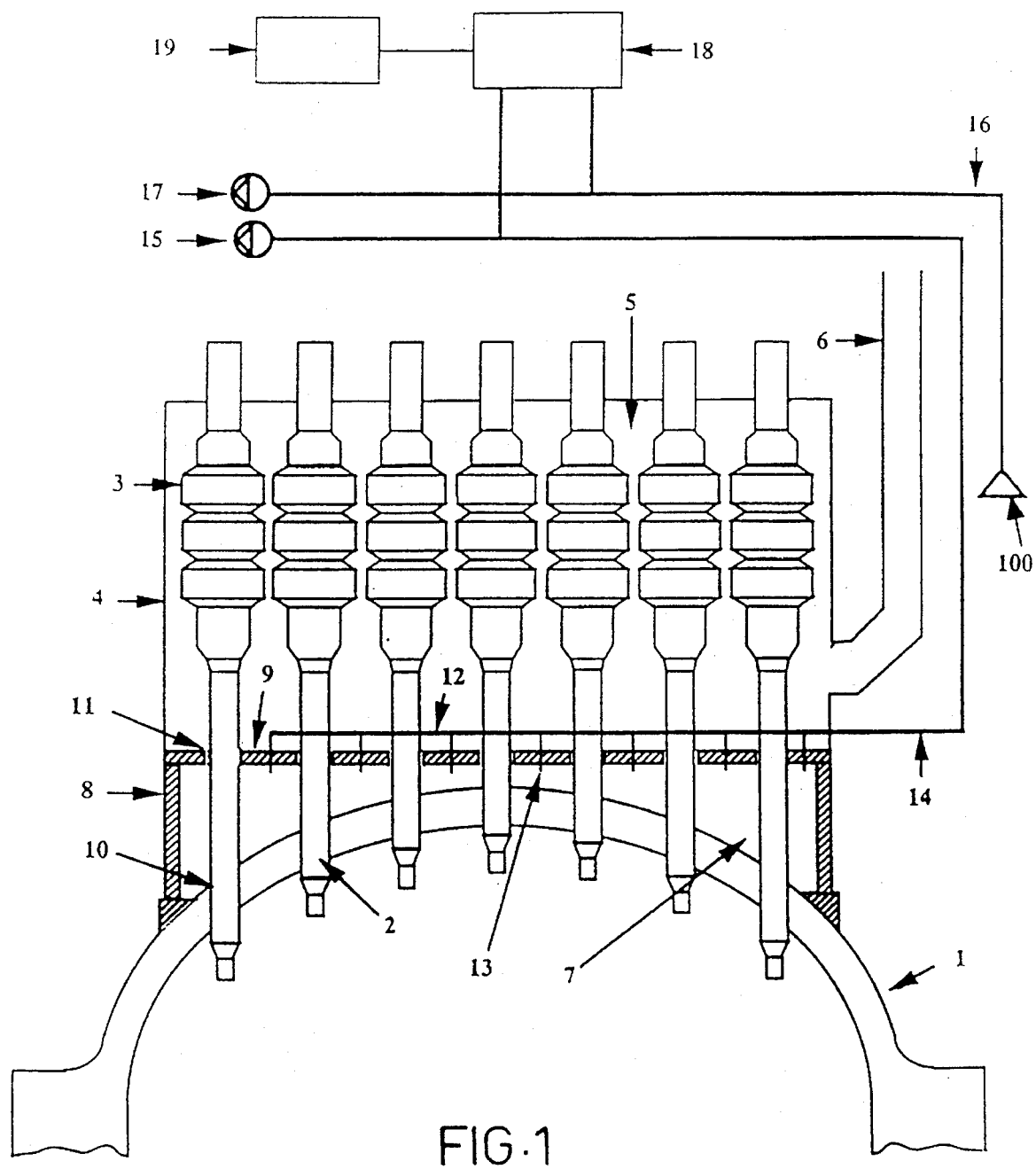
FIG. 1 is a diagrammatic illustration of one embodiment of a device according to the invention, intended for picking off samples of air inside and outside the volume of the chamber where the potential leaks to be detected emerge.

FIG. 1 illustrates the surroundings of, that is to say what is situated close by, the vessel head of a pressurised water nuclear reactor, and which is necessary for the invention.

A vessel head 1 is provided with penetrations 2 which allow the rods of the control rod clusters, not shown, to pass through, which rods are controlled by mechanisms 3. A ventilation circuit cools the mechanisms 3. This circuit consists of an enclosure 4 surrounding the control mechanisms 3. Ambient air, which is sucked in above the enclosure 4 at its upper part 5, redescends into the volume of the enclosure 4 along the control mechanisms 3 and is sucked into one of the ducts 6, only one of which is shown. A chamber 7, normally called the "interior of the casing" is bounded by the vessel head 1 and thermal insulation plates 8 and 9. This cheer 7 confines the interfaces or junctions 10 between the penetrations 2 and the upper wall of the vessel head 1; it is at these interfaces or junctions that the possible leaks which the invention aims to detect emerge or appear.

In normal operation, the ventilation circuit of the control mechanisms 3 of the rod clusters sucks the air into the chamber 7 through the clearances 11 which exist between the plates 8, 9 and the penetrations 2. These clearances 11 differ, and the local air flow rates around the penetrations 2 are not homogeneous.

The function of the pick-off circuit according to the invention is that of sucking out a sample of air contained in the volume of the chamber 7, which sample is loaded with water vapour released by the leak.

One of the difficulties raised by the pick-off technique resides in the fact that the air sample must be picked off before the water vapour is diluted in the high throughput of ventilation air which flows in the enclosure 4 then in the ducts 6.

This difficulty is solved by a particular arrangement of the picking off which consists in continuously sucking the air to be analyzed within the volume of the chamber 7. This suction is provided using pipes 12 provided with tubes 13 which emerge into the chamber 7. All the pipes 12 are grouped on a common manifold 14. A pump 15 carries out the sampling of the air picked up from the volume of the chamber 7.

Similarly, another pipeline 16 connected to another pump 17 picks off a sample of air from the containment 100 of the building of the reactor.

A measurement assembly 18 is connected in by-pass to the manifold and pipeline 14 and 16 respectively, to measure the difference in concentration of the tracer in the two samples flowing in this manifold and pipeline pair 14 and 16.

A leak is detected when the difference in concentration between these two samples is greater than the normal measurement uncertainties of the measurement assembly. This measurement assembly comprises improvements aiming to limit or detect: malfunctions of the tracer detector, with a view to avoiding false alarms.

This measurement assembly 18 is connected to a control and processing unit 19 comprising a suitable, appropriate, preferably industrial, computer which allows control and command of the transmitters and actuators necessary for the measurements and for their interpretation. This unit is advantageously housed outside the containment of the building of the reactor.

Figure 2:
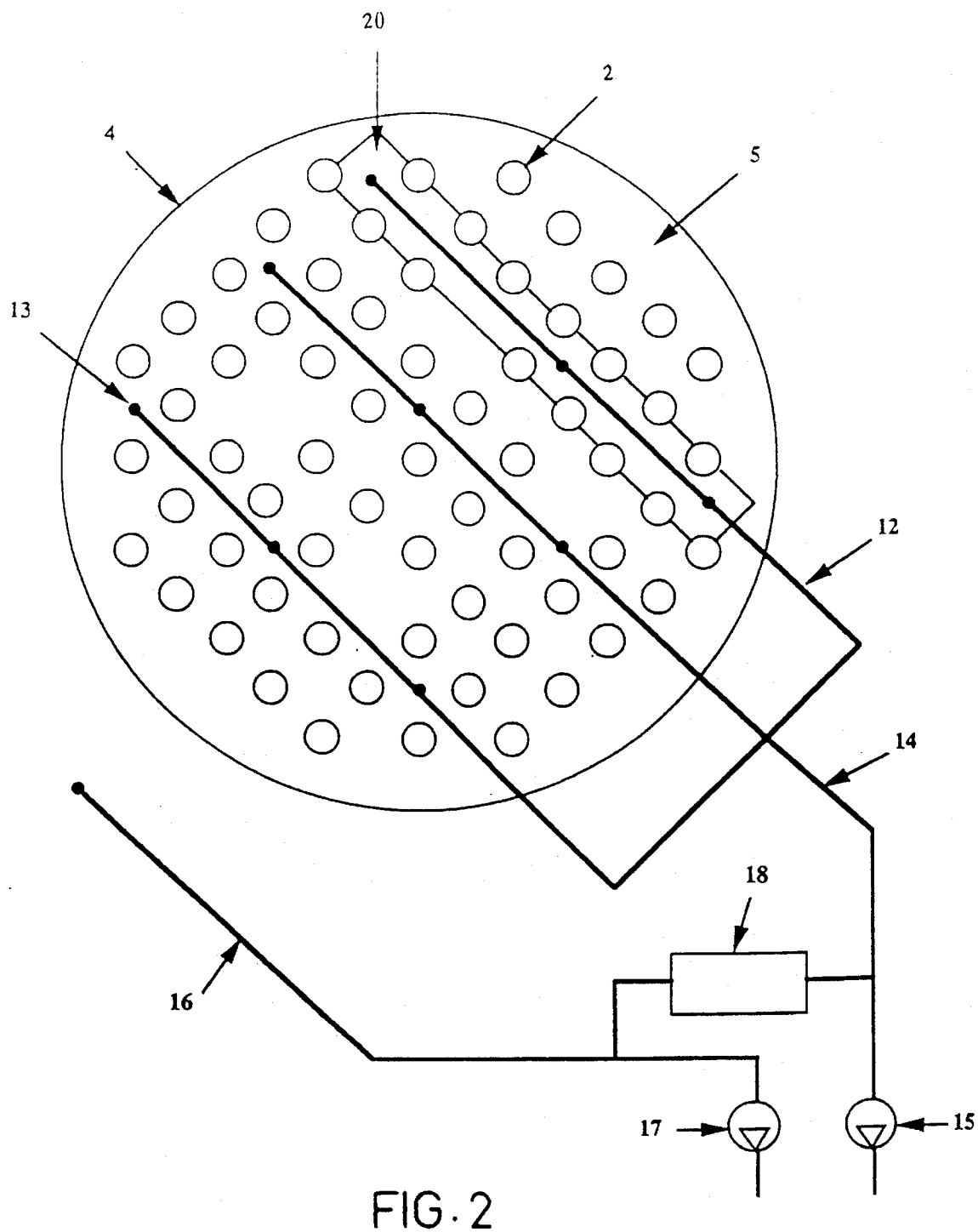
FIG. 2 represents a plan view of FIG. 1.

FIG. 2 illustrates a plan view of FIG. 1. The suction pipes 12 allowing picking off of air from the chamber 7 are seen. These pipes are connected to the common manifold 14. The pump 15 allows the gas contained in the manifold 14 to be transported. The pipes 12 advantageously run above bands 20 which constitute the upper thermal insulation plates 9 onto which they are fixed. A smaller number of tubes 13, which pass through the thermal insulation only, are connected to the pipes 12 and allow the picking off of air in the chamber 7. An expedient arrangement of these pick-off tubes 13 makes it possible to cover the entire detection region homogeneously. This configuration of the pick-off circuit has the essential advantages of simplicity, easy installation because of the attachment of the pipes 12 and the bands 20, and the limited number of pick-off points.

Figure 3:
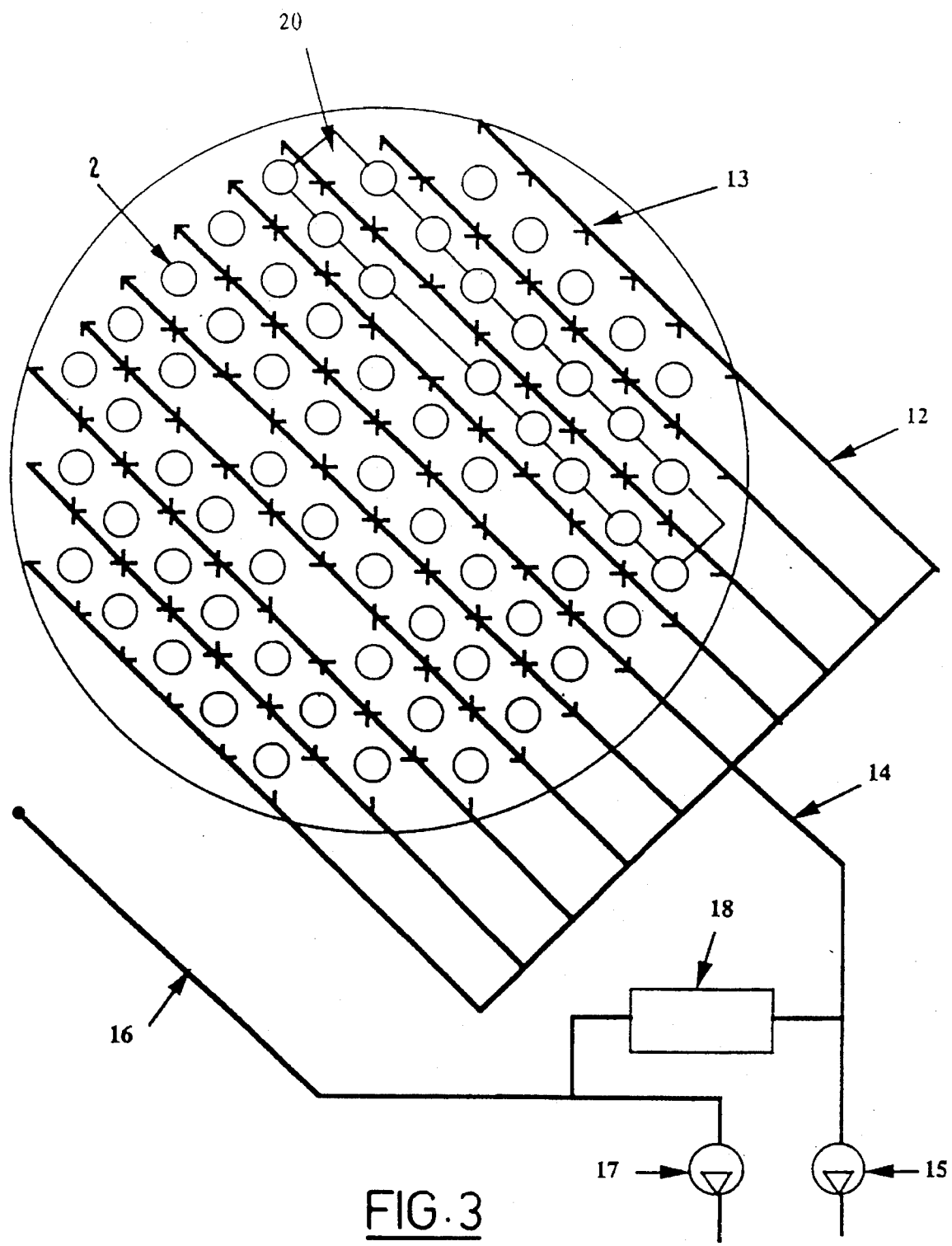
FIG. 3 is a view similar to that in FIG. 2 of a variant embodiment of the invention.

FIG. 3 illustrates a plan of a variant of the circuit for picking off the air from the chamber 7. Its essential advantage over the one previously described is that each penetration 2 is surrounded by four pick-off tubes 13 arranged practically in a square, thus making detection of the leaks easier because of the individual monitoring of each penetration 2. The pick-off tubes 13 are connected to the pipes 12 which are solidly attached to the thermal insulation bands 20 and are connected together by the common manifold 14 in a manner similar to that previously explained. The sections of the pipes 12 and of the tubes 13 are such that the suction flow rates are balanced for all the penetrations 2. Identical sensitivity for detecting the leaks is thus obtained, whatever the position of the defective penetration 2.

Figure 4:
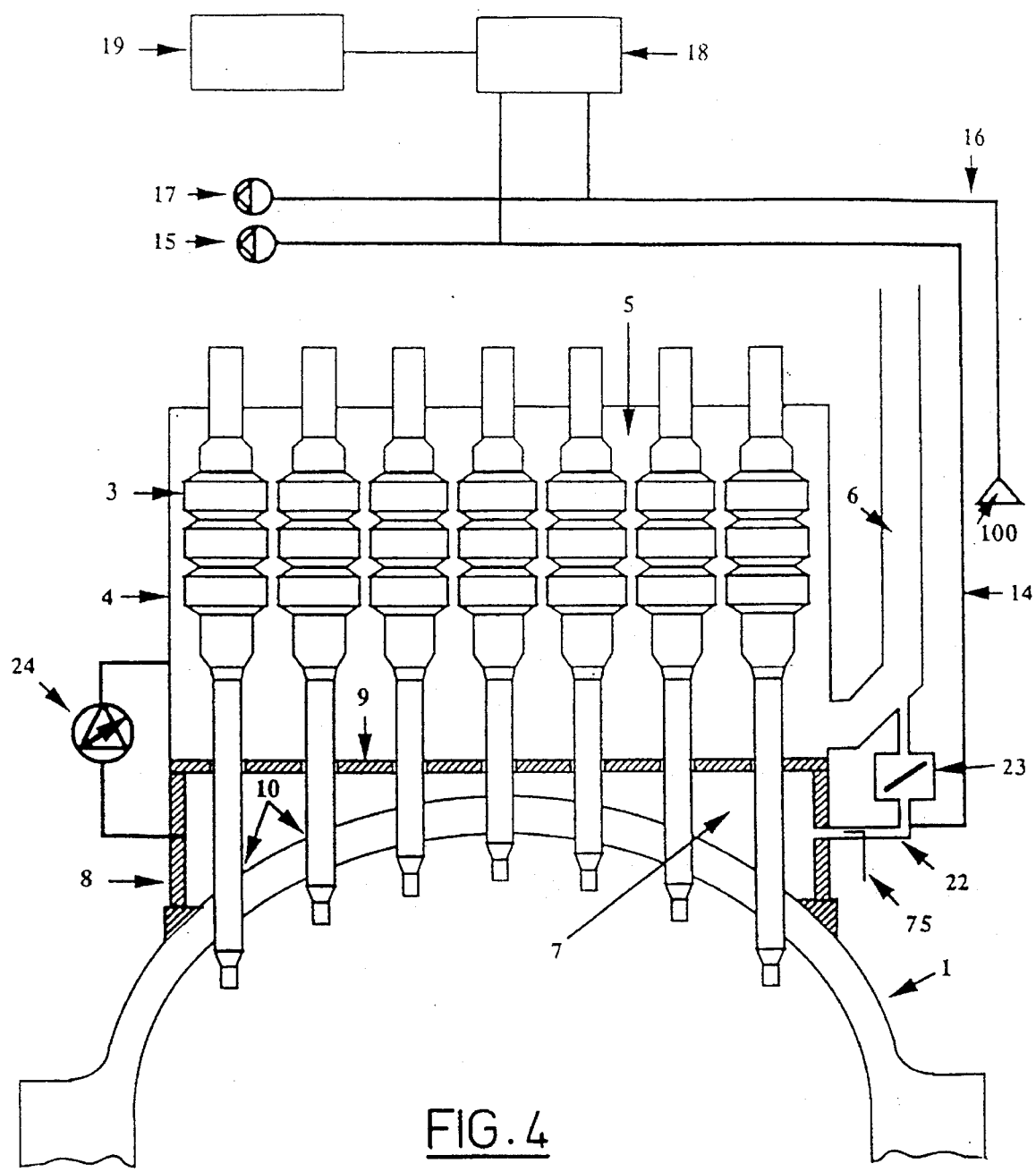
FIG. 4 is a view similar to that in FIG. 1 of a variant embodiment of the invention.

FIG. 4 illustrates another variant of the circuit for picking off air from the chamber 7. One of the technical difficulties raised by the picking off is that this pick off must be homogeneous throughout the chamber 7 so that the sensitivity of the technique for detecting the leaks does not depend greatly on the position of the defective penetration 2. This difficulty is resolved by a particular arrangement of the pick-off circuit, which consists in installing, as illustrated, at least one sleeve 22 in by-pass between a suction duct 6 of the ventilation circuit of the mechanisms 3 for controlling the rod clusters and the chamber 7. By a "water pump" effect, a suction flow is created in the sleeve 22 which depressurises the chamber 7. This flow and this pressure reduction are regulated using a damper 23 and a differential pressure sensor 24 so that the chamber 7 is at a very slightly lower pressure than the enclosure 4. The flow of air is then reversed between the enclosure 4 and the chamber 7, and all the air sweeping the chamber 7 is taken up by the sleeve 22. In the event of a leak, this sweeping air collects all the tracer released, independently of the position of the defective penetration 2. The sweeping air passes into the sleeve 22 where the pick-off manifold 14 sucks out a sample using the pump 15. The pipeline 16, connected to the pump 17, also picks off a sample of the ambient air in the confinement enclosure 100. The measurement assembly 18 is connected, as indicated previously, in by-pass on the manifold and pipeline pair 14 and 16, to measure the difference in concentration of the tracer in the two samples flowing in this manifold and pipeline 14 and 16. The sensor 75, such as, for example, a hot-wire anemometer or a Pitot tube, makes it possible to determine the flow rate through the sleeve 22. Measuring this flow rate, combined with the humidity measurements described below, allows an estimate of the possible flow rate of the leak detected.

Figure 5:
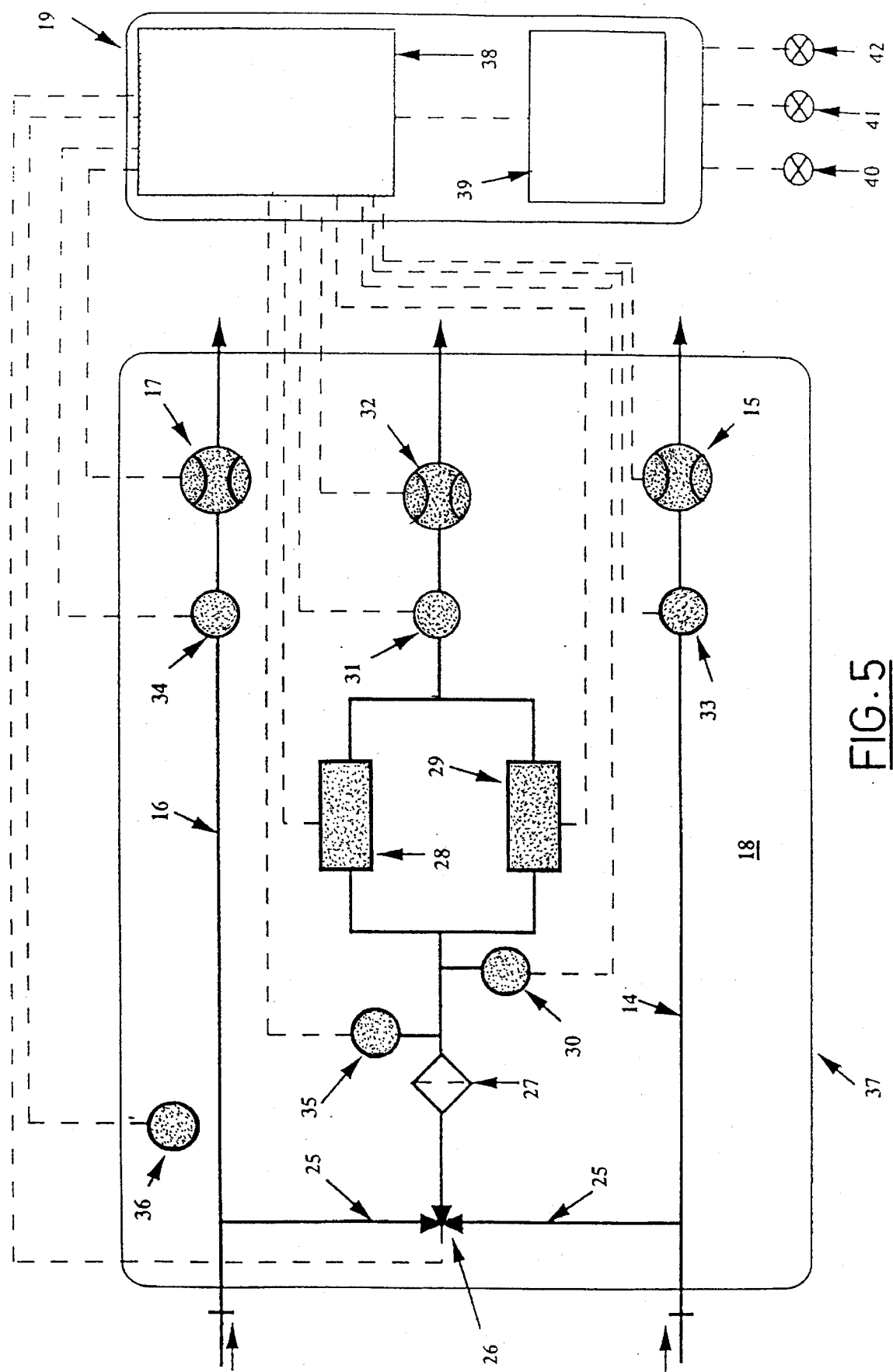
FIG. 5 is a flow diagram of the measurement assembly and of a processing and control unit which is connected to it.

FIG. 5 illustrates the functional branchings and connections of the measurement assembly 18. Two by-pass lines 25 are connected to the pick-off pipeline and manifolds 16 and 14, and to a three-way solenoid valve 26 whose function is alternately to send a sample of air flowing in the manifold and pipeline 14 and 16 to a filter 27. The function of this filter is to remove the dust and vapours other than the water vapour, to avoid fouling of the humidity detectors 28 and 29 or hygrometers which are connected to the filter 27 and mounted in parallel. An absolute-pressure sensor 30 allows water vapour partial pressure correction in each sample coming alternately from the manifold and from the pipeline 14 and 16, in the event of pressure differences existing between this manifold and this pipeline 14 and 16.

The overall flow rate through the humidity detectors 28 and 29 is measured using a flow meter 31. A pump 32 provides the pressure reduction necessary for the air to flow through the measurement assembly 18. The flow rate in each of the pick-off pipeline and manifold 16 and 14 is provided by the pumps 17 and 15 respectively, and is measured by the flow meters 34 and 33. A temperature sensor 35 measures the temperature of the sample to be analyzed and makes it possible to ensure that the detectors are used in their measurement range. A temperature sensor 36 measures the ambient temperature in a cabinet 37 where the measurement assembly is placed. This cabinet 37 is thermostated and provided with appropriate conventional dismountable connectors for linkage with the assembling circuit.

The solenoid valve 26, the measurement output of the humidity detectors 28, 29, of the pressure sensor 30, of the flow meters 31, 33, 34, and of the temperature sensors 35, 36 are connected to a measurement and control system 38 associated with a computer 39 which, together, constitute the processing and control unit 19. This unit 19 fulfils the functions of control, measurement, interpretation of the measurements and control of the alarms. The connections with the measurement assembly 18 are diagrammatically represented in broken lines.

The uncertainties in measuring the difference in concentration of the tracer are greatly reduced by the alternate "switch-over" of the samples on the same detectors. This makes it possible to cancel systematic errors and slow drifts of the detectors when calculating the difference in concentration.

When the difference in the tracer concentration measurements of the two samples is greater than the normal measurement uncertainties of the two detectors, taking into account the cancellation of systematic errors and the absolute pressure correction, the unit 19 indicates the presence of a leak and triggers a "leak" alarm 40.

Measuring this difference in concentration makes it possible to calculate the leakage flow rate by virtue of the prior knowledge of the sweeping flow rate passing through the chamber 7. This sweeping flow rate can be estimated by using one of the techniques provided according to the invention and described below.

The presence of two identical detectors measuring the same concentration makes it possible to compare their indications and therefore to detect an excessively high measurement difference. Such an abnormal difference indicates malfunction of at least one of the detectors. In this event, a "system" alarm 41 is generated by the processing and control unit 19 to initiate a servicing operation or replacement of the detectors.

The monitoring is designed so as to minimise the frequency of false "leak" alarms. The unit 19 regularly monitors the various functions of the measurement chain and triggers the "system" alarm 41 in the following non-limiting cases:

excessively low airflows through the manifold and pipeline 14 and 16, measured by the flow meters 33 and 34, excessively low flow of air through the hygrometers 28, 29, measured by the flow meter 31, excessively low or excessively high temperature of the air sample analyzed by the humidity detectors 28, 29, and measured by the sensor 35, difference between the temperature of the cabinet 37, measured by the temperature sensor 36, and the dew temperature measured by one of the humidity detectors 28 or 29, being less than a certain threshold.

When the dew temperature measured by the humidity detectors 28 and 29, and the temperature of the cabinet 37, measured by the temperature sensor 36, are very close, the unit 19 triggers a particular alarm 42 indicating "saturation" of the measurement.

Degradation of the humidity detectors 28, 29 is reduced by the presence of the filter 27 which greatly limits fouling of these detectors. The humidity detectors 28 and 29 are, for example, cooled-mirror, lithium chloride or capacitive hygrometers.

The measurement means advantageously operate by cooled-mirror hygrometry. It is possible in particular to use hygrometers having a cycle of virtual cleaning of the mirror so as to limit its servicing. These mirror hygrometers give a precise indication on the dew temperature of the sampled air.

Figure 6:
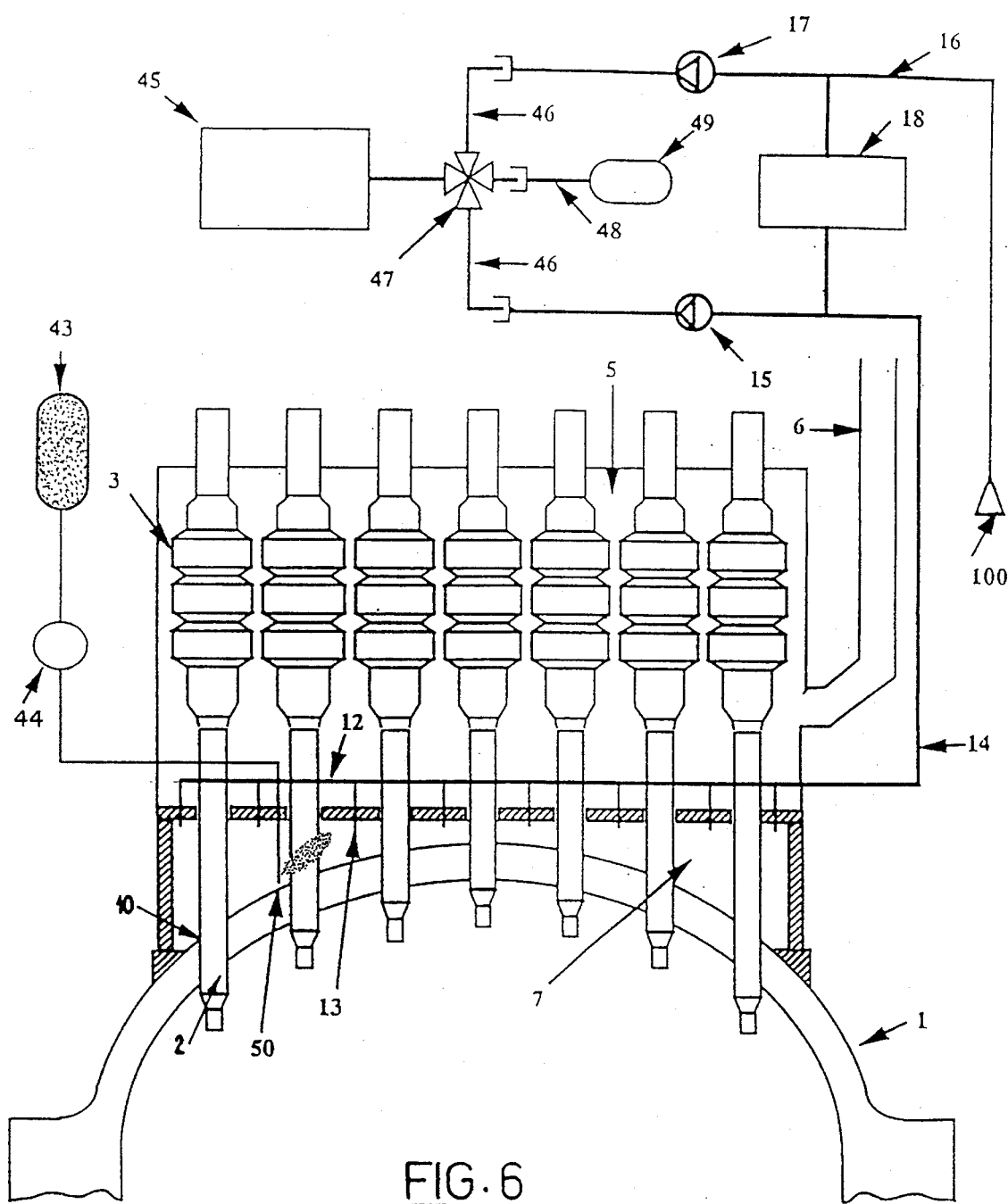
FIG. 6 is a view similar to that in FIG. 1, illustrating a leak simulator and its implementation according to the invention.

FIG. 6 diagrammatically illustrates a leak simulator allowing evaluation of the air flow passing through the chamber 7. This evaluation can be made during hot shutdown, preceding restarting of the reactor, in order to benefit from conditions as close as possible to those of the operation of the pick-off and leak detection devices.

This simulator device uses a tracer gas, such as helium, which is advantageously detected by mass spectrometry. This gas, being inert and non-toxic, can be employed with ease. Using a mass spectrometer for the detection allows a large dynamic measurement range.

The essential difficulty encountered in using this gas resides in the representivity of the vapour leak to be simulated. This difficulty is surmounted by using a tracer gas mixture such that its density is as close as possible to that of the water vapour coming from a leak. It is, for example, possible to use a mixture of air (53%)—helium (47%) or alternatively a mixture of neon (82%)—helium (18%). Furthermore, the gas mixture flow rate used is identical to that of the minimum leak which the device previously described aims to detect, i.e. 1 kg/h. Finally, the injection is carried out as close as possible to the head/penetrations ½ interfaces or junctions 10, this being the place where the leaks appear.

The technique used is as follows.

A continuous flow of a tracer gas mixture contained in a cylinder 43 is injected into the chamber 7 through a mass flow rate regulator 44, allowing control of this flow. The tracer gas mixture is transported into the chamber 7 through an immersed injector 50 which emerges near a head/penetration interface 10. The helium mixes with the sweeping air passing through the chamber 7. The pick-off circuit, as described with regard to FIGS. 1, 2 or 3, allows the gas to be transported to a mass spectrometer 45. This mass spectrometer allows measurement of the helium content of the gas transported by the pick-off circuit, at the output of the pumps 15 and 17. A multi-way valve 47 makes it possible to take a measurement either from the air sampled from the chamber 7 or from the air sampled from the outside 100 of the chamber 7, which is used as a reference. Calculating the ratio of the helium concentrations measured in the manifold and pipeline pair 14 and 16 makes it possible to calculate the dilution of the tracer and to calculate therefrom the local sweeping flow rate of air in the chamber 7.

Most of the helium injected into the chamber 7 is taken up by the ventilation of the control mechanisms 3 of the rod clusters through the suction ducts such as 6. After passing over cooling coils, not illustrated, the air and the helium which is contained therein recirculate into the building of the reactor 100. The helium therefore partly accumulates in the reactor building because of the closed-circuit ventilation of the control mechanisms 3. This accumulation of helium in the building of the reactor is taken into account by making, in an original manner, an additional measurement which allows calibration of the signals delivered by the mass spectrometer 45. In order to do this, use is made of a gas reserve 49 containing helium at a perfectly known level, which is connected, via a line 48, to the multi-way valve 47 which is itself connected to the mass spectrometer 45. This gas reserve 49 may quite simply be the atmospheric air which naturally contains 5.2 parts per million of helium. The successive measurements of the helium content in the manifolds, pipeline and line 14, 16 and 48 allow better evaluation of the local flow rate of sweeping air in the chamber 7.

Different local sweeping flow rates can be calculated from as many points of injection into the chamber 7. The maximum sweeping flow rate locally measured is then adopted for checking that the measurement assembly 18, taking into consideration its intrinsic performance, can detect a primary water vapour leak of 1 kg/h.

This technique can be applied after each reassembly of the thermal insulation and of the constituent elements of the pick-off circuit, in order to ensure correct operation thereof. Its use can be limited to injecting the tracer mixture at a single point: the one where a maximum local sweeping flow rate has been measured during previous tests.

Figure 7:
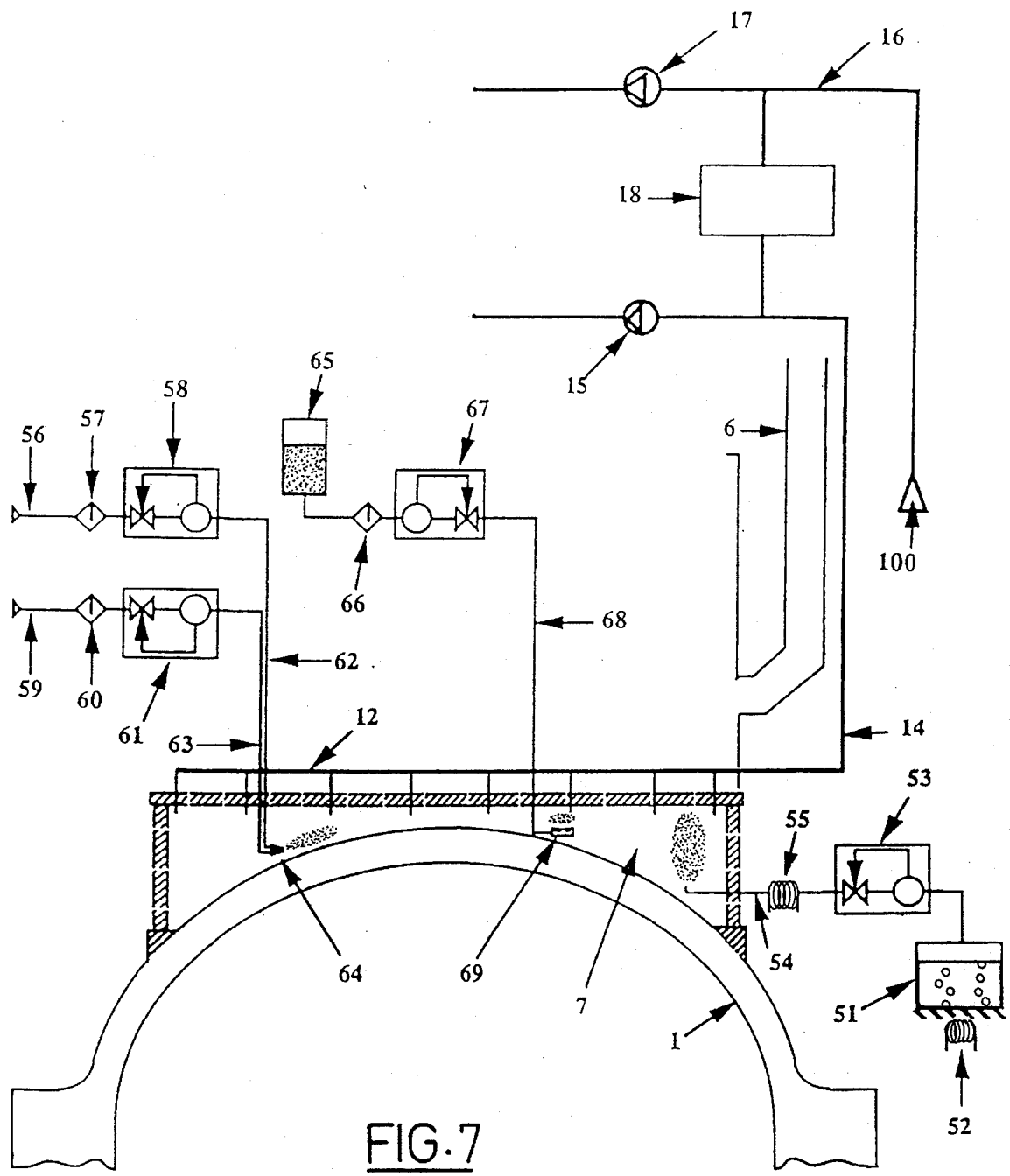
FIG. 7 is a view similar to that in FIG. 6, illustrating a variant embodiment of a leak simulator and its implementation according to the invention.

FIG. 7 partially and diagrammatically illustrates the simulator of a leak of water vapour into the chamber 7, nearest the head/penetrations ½ interfaces or junctions 10.

Injecting water vapour into the chamber where the possible leaks emerge is particularly advantageous in the case when the leak detection device used is based on the humidity detection according to the invention. This injection of a known flow of water vapour makes it possible simultaneously to check that the detection device is operating properly, that it has sufficient sensitivity and that the pick-off system is operating correctly.

A first entity is composed of a containment 51 containing water heated to boiling point using a heating element 52. The vapour thus produced, whose flow rate is regulated by a flow rate regulator 53, is transported into the chamber 7 through a line 54 after passing through a superheater 55 in order to prevent any condensation of water before it enters the chamber 7.

A second and a third entity are used for introducing water into the chamber 7 and to make use of the high temperature which exists therein to convert this water into vapour.

The second entity is a pneumatic atomizer assembly consisting, on the one hand, of a water supply 56 passing through a filter 57 and a pressure regulator 58 and, on the other hand, of a compressed air supply 59 passing through another filter 60 and a pressure regulator 61. Two water 62 and air 63 conduits penetrate the chambers 7 where they supply a nozzle 64 whose characteristics are known. This nozzle allows atomisation of the water with a known flow rate, in proximity to a head/penetration ½ interface or junction 10. The sufficiently high temperature existing in the chamber 7 converts the water droplets into vapour.

The third entity consists of a tank 65 containing water which passes through a filter 66 and a flow rate regulator 67. This water is transported by a conduit 68 into the chamber 7 in a cartridge 69. This cartridge 69 mainly consists of a heat-resistant and water-permeable material such as a sintered metal, glass fibre or high-density steel wool. The sufficiently high temperature existing in the chamber 7 converts the water flush with the surface of the cartridge into vapour.

The method is implemented in the following manner using the device previously described.

The procedure for detecting leaks is as explained below.

With the ventilation of the rod cluster mechanisms 3 being in operation, a flow of sweeping air passing through the volume of the chamber 7 is set up.

Air is picked off from the volume of the chamber 7 continuously using the pump 15 installed in the intake manifold 14.

Another air sample 100, outside the volume of the chamber 7, is picked off continuously using the pump 17 mounted on the intake pipeline 16.

In both cases, the pick-off is carried out at a low flow rate (approximately 3 m$^3$/h each).

Sampling of approximately 100 l/h, made by the pump 32, allows air to be analyzed to be let into the humidity detectors or hygrometers 28 and 29. This air comes alternately from the manifold and pipeline 14 and 16. The switch-over of the sampling is made periodically by the solenoid valve 26. The time period of this switch-over is approximately 20 min, for example.

The first step is waiting for the signals delivered by the hygrometers 28, 29 to stabilize. No "leak" alarm 40 can be generated during this time.

In a second step, signals delivered by each of the hygrometers 28, 29 are recorded periodically. The means of the measurements made are then calculated. These values are displayed by the computer 39.

Following this calculation, the unit 19 first assesses the detection system. A "system fault" alarm 41 is generated in the event that the thresholds for correct operation of the equipment are exceeded or in the event of an excessively large disparity in the signals delivered by the hygrometers. The computer 39 then compares the means of the measurements acquired in one of the pick-off lines with the mean of the measurements acquired in the other pick-off line.

If the difference of the measurement averages calculated exceeds a certain threshold, a "leak" alarm 40 is generated by the unit 19.

The natural presence of water vapour in the volume of the chamber 7 gives a stable indication and does not prevent high measurement sensitivity. It is possible to detect dew temperature variations between the two pick-off lines which are of the order of 0.4° C., and leaks of water vapour in the chamber 7 of the order of 1 kg/h under unfavourable conditions (high sweeping flow rate in the volume of the chamber 7 and high ambient dew temperature).

The presence of a leak is always characterized by a statistically stable increase in the quantity of water vapour measured in the pick-off made in the chamber 7, with respect to the water vapour content measured outside this chamber.

In order to evaluate the leaks detected, the procedure is as below.

The indication of the flow rate of sweeping air passing through the volume of the chamber 7 and taken up in whole by the sleeve 22, combined with the measurements delivered by the hygrometers 28 and 29, displayed by the computer 39, allows the operator of the nuclear installation to calculate and to periodically monitor the development of the leak possibly detected.

In the case when the pick-off is carried out as illustrated in FIGS. 1, 2, or 3, the use, on each restart of the installation, of a leak simulation technique, using either a tracer gas mixture including helium, or water vapour, makes it possible to evaluate the maximum local sweeping flow rate passing through the volume of the chamber 7. This evaluation and the indications provided by the hygrometers allow the operators of the nuclear installation to estimate a maximum value of the flow rate of the leak detected.

In order to check correct operation of the pick-off and leak detection devices, the procedure explained below is preferably carried out periodically.

Whatever the pick-off device used, one of the leak simulation techniques proposed can be employed on each restart of a reactor. Either a tracer gas mixture containing helium, or water vapour, is injected into the volume of the chamber 7 with a flow rate corresponding to that of the leak which it is desired to detect. In the first case, the detection is made with the mass spectrometer 45 and only correct operation of the pick-off system is checked. In the second case, detection is carried out with the humidity detectors 28 and 29, and correct operation of the pick-off system used and of the measurement assembly 18 are simultaneously checked by triggering the alarm 40 corresponding to the appearance of a leak.

The techniques of programming a computer are well known and do not form part of the invention.

From the above description, the benefit of the invention is clear and the advantages which it provides are understood, especially as regards safety by allowing very early modification of the operational regime of the nuclear installation, in order to switch it over to a planned fall-back solution.

What is claimed is:

1. Device for detecting leaks in penetrations (2) of a nuclear power station vessel head (1), characterized in that it comprises a circuit for picking off the air flowing in the volume of the chamber (7) where possible leaks (10) emerge, before this air is diluted in the cooling circuit (4, 5, 6) of the control mechanisms (3) of the control rod clusters of the reactor.

2. Device for detecting leaks in penetrations (2) of a nuclear power station vessel head (1), according to claim 1, characterized in that the pick-off circuit includes pipes (12) which are provided with suction tubes (13) passing through thermal insulation (8, 9) of the vessel head (1) and which are fixed to thermal insulation bands (20) and connected together (12) using a common manifold (14).

3. Device for detecting leaks in penetrations (2) of a nuclear power station vessel head (1), according to claim 2, characterized in that the pick-off circuit includes pipes (12) fixed to the thermal insulation bands (20) and provided with multiple suction tubes (13) arranged practically in a square around each penetration (2) so as to allow individual monitoring of each of the penetrations (2).

4. Device for detecting leaks in penetrations (2) of a nuclear power station vessel head (1), according to claim 1, characterized in that the pick-off circuit comprises at least one sleeve (22) connecting the volume of the chamber (7) to the cooling circuit (4, 5, 6) of the rod cluster control mechanisms (3), so as to suck out all of the air flowing in the volume (7) where the possible leaks (10) emerge.

5. Device for detecting leaks in penetrations (2) of a nuclear power station vessel head (1), according to claim 4, characterized in that the pick-off circuit comprises a suction manifold (14), or several pick-off pipes (12) connected together, entering one or more sleeves (22) connecting the volume of the chamber (7) where the possible leaks (10) emerge, to the cooling circuit (4, 5, 6) of the control mechanisms (3) of the rod clusters.

6. Device for detecting leaks in penetrations (2) of a nuclear power station vessel head (1), according to claim 1, characterized in that the sleeve or sleeves (22) are provided with a damper (23) making it possible to adjust the pressure differential between the volume of the chamber (7) containing the head (1)/penetration (2) interfaces (10) and the volume of the enclosure (4) containing the rod cluster control mechanisms (3), using a differential pressure sensor (24).

7. Device for detecting leaks in penetrations (2) of a nuclear power station vessel head (1), according to claim 1, characterized in that it comprises a assembly (18) for measuring a difference in concentration of water vapour released by a leak (10), which difference is measured between the air picked off from the volume of the chamber (7) bounded by the thermal insulation (8, 9) of the head and the vessel head (1) itself, and the ambient air of a building of the reactor (100).

8. Device for detecting leaks in penetrations (2) of a nuclear power station vessel head (1), according to claim 7, characterized in that the measurement assembly (18) measures the difference in concentration of the water vapour in two samples of air, one coming from the volume of the chamber (7) and the other from the building of the reactor (100), by alternately passing the two samples through to identical cooled-mirror hygrometers (28 and 29) mounted in parallel.

9. Device for detecting leaks in penetrations (2) of a nuclear power station vessel head (1), according to claim 8, characterized in that the measurement assembly (18) comprises a filter (28) removing dust and vapours other than the water vapour, making it possible to avoid fouling of the two hygrometers (28 and 29) and reducing the maintenance operations on them.

10. Device for detecting leaks in penetrations (2) of a nuclear power station vessel head (1), according to claim 9, characterized in that it includes an absolute-pressure sensor (30) allowing water vapour partial pressure correction in the event of pressure differences existing between the pick-off manifold (14) and the reference pipeline (16) connected to the building of the reactor (100).

11. Device for detecting leaks in penetrations (2) of a nuclear power station vessel head (1), according to claim 10, characterized in that the measurement assembly (18) is corrected to a processing and control entity (19) capable of generating an alarm (40) representing a leak (10) as soon as the difference in water vapour concentration measured between the air picked off from the chamber (7) and the ambient air of the building of the reactor (100) is greater than the measurement uncertainties.

12. Device for detecting leaks in penetrations (2) of a nuclear power station vessel head (1), according to claim 11, characterized in that the measurement assembly (18) is connected to a control and processing entity (19) capable of generating an alarm (41) when the difference in the measurements becomes abnormally high, which alarm indicates that a maintenance or servicing operation is necessary for the detectors.

13. Device for detecting leaks in penetrations (2) of a nuclear power station vessel head (1), according to claim 10, characterized in that the measurement assembly (18) is installed in a thermostated leaktight cabinet (37), itself provided with dismountable means for connecting it with the pick-off circuit.

14. Method for evaluating the flow rate of sweeping of the volume of a chamber (7) where possible leaks (10) emerge, characterized in that a mixture of tracer gas (43) containing helium is injected (50) into this volume, the concentration of this gas is detected and measured by a mass spectrometer (45) at the outlet of pumps (15) and (17) placed respectively on a manifold (14) for pick-off from the chamber (7) and a pipeline (16) for pick-off from the building of a nuclear reactor (100).

15. Method for simultaneous testing of correct operation of the device according to claim 1, characterized in that the presence of a leak is simulated by injecting water vapour (56, 57, 58, 59, 60, 61, 62, 63) in proximity (64) to locations where there is a risk of the leaks (10) occurring.

* * * * *